United States Patent [19]

Huber et al.

[11] Patent Number: 4,600,237
[45] Date of Patent: Jul. 15, 1986

[54] SWITCH FOR A SLIDING-LIFTING-ROOF OF A MOTOR VEHICLE

[75] Inventors: Guntram Huber, Aidlingen; Günter Gmeiner; Rolf Krügener, both of Sindelfingen, all of Fed. Rep. of Germany

[73] Assignee: Daimler-Benz Aktiengesellschaft, Fed. Rep. of Germany

[21] Appl. No.: 728,030

[22] Filed: Apr. 29, 1985

[30] Foreign Application Priority Data

Apr. 28, 1984 [DE] Fed. Rep. of Germany ....... 3415997

[51] Int. Cl.⁴ ............................................... B60J 7/04
[52] U.S. Cl. .................................... 296/223; 200/308
[58] Field of Search ............... 296/216, 222, 221, 223; 200/52 R, 5 R, 159, 61.45, 329, 308, 340; 318/226, 468; 49/211, 214

[56] References Cited

U.S. PATENT DOCUMENTS

| Re. 28,346 | 2/1975 | Kouth et al. | 296/221 |
| 4,164,692 | 8/1979 | Mitterer et al. | 318/266 |
| 4,438,972 | 5/1984 | Katayama et al. | 296/221 |

FOREIGN PATENT DOCUMENTS 57-66014  4/1982  Japan ................... 296/223

Primary Examiner—Robert R. Song
Attorney, Agent, or Firm—Craig and Burns

[57] ABSTRACT

A switch with a control element for a sliding-lifting-roof remotely actuated by an auxiliary force and installed into a vehicle roof, whereby the control element symbolically corresponds approximately to the shapes of the sliding-lifting-roof and is arranged in a part of the switch symbolically corresponding approximately to the shapes of the entire vehicle roof in plan view in such a manner that overall the vehicle roof with installed sliding-lifting-roof is symbolized thereby.

25 Claims, 3 Drawing Figures

SWITCH FOR A SLIDING-LIFTING-ROOF OF A MOTOR VEHICLE

The present invention relates to a switch for a sliding-lifting-roof of a motor vehicle remotely actuated by an auxiliary force, by means of which the adjusting drives of the roof for the sliding roof function can be activated by oppositely directed sliding movements of a control element and by means of which the adjusting drives for the lifting roof function can be activated by oppositely directed pivot movements of a control element.

A switch of the aforementioned type is already known in the prior art (DE-OS No. 31 17 040), in which by oppositely directed sliding movements of a sliding control element of the switch, the adjusting drives of the roof for the sliding roof function can be activated and in which by oppositely directed pivot movements of a further operating element of the switch, the adjusting drives of the roof for the lifting roof function can be activated. The two operating elements are thereby correspondingly identified or labelled, whereby the identification or labelling is coordinated analogously to the movement direction of the sliding-lifting-roof corresponding to the direction movement of the control element. Similar control elements are known in motor vehicles, for example, also for the seat adjustment system, the seat heating system, the rear window heating system, etc. so that the large number of the labelling and picture symbols on the control elements arranged for the most part adjacent one another frequently entails for the user the difficulty that he cannot find the correct switch symbolizing the function at first try.

However, even if the desired control element has been recognized, it frequently still remains difficult to read off the correct functions by reference to the symbols, for example, OPEN-CLOSE, OPENING-CLOSING, etc.

The present invention invention is therefore concerned with the task to simplify the switch of the aforementioned type and to provide a switch with a control element which enables an operating person, on the one hand, to immediately find the correct switch from among the large number of control elements and, on the other, to initiate the desired adjusting movement rapidly and without errors.

The underlying problems are solved according to the present invention in that the switch for both oppositely directed movements (sliding and pivot movements) includes only a single control element whose visible surface configuration facing an operating person symbolically corresponds approximately to the shapes of the sliding-lifting-roof and which is so arranged in a surface flange part symbolically corresponding in plan view approximately to the shape of the entire vehicle roof that altogether the vehicle roof together with built-in sliding-lifting-roof is symbolized thereby.

These and other objects, features and advantages of the present invention will become more apparent from the following description when taken in connection with the accompanying drawing which shows, for purposes of illustration only, one embodiment in accordance with the present invention and wherein.

Figure 1:
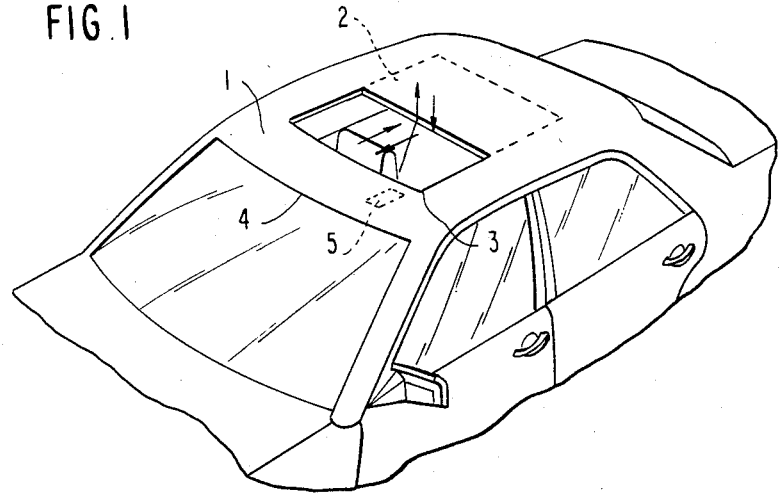
FIG. 1 is a schematic perspective view of a motor vehicle roof with sliding-lifting-roof controlled by a switch in accordance with the present invention.

Referring now to the drawing wherein like reference numerals are used throughout the various views to designate like parts, a sliding-lifting-roof 2 is installed in the roof 1 of a motor vehicle, which can be actuated by a switch 5 arranged on the inside of the vehicle, for example, between the forward sliding-lifting-roof edge 3 and the forward roof edge 4, i.e., the movements of the sliding-(lifting-)roof, OPEN-CLOSED or of the (sliding-)lifting-roof, OPEN-CLOSED can be initiated in a known manner.

Figure 2:
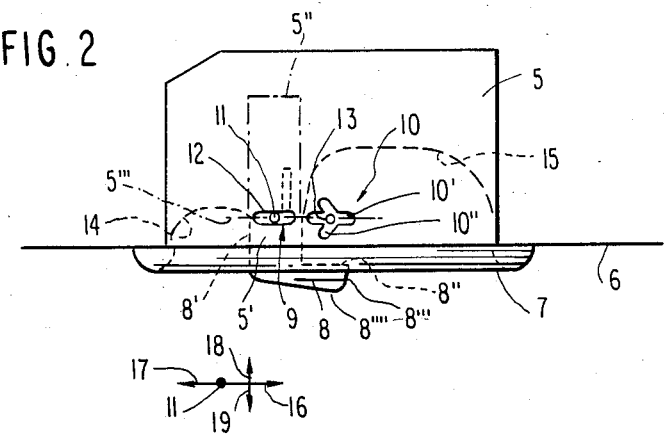
FIG. 2 is a schematic side view of a switch in accordance with the present invention.
Figure 3:
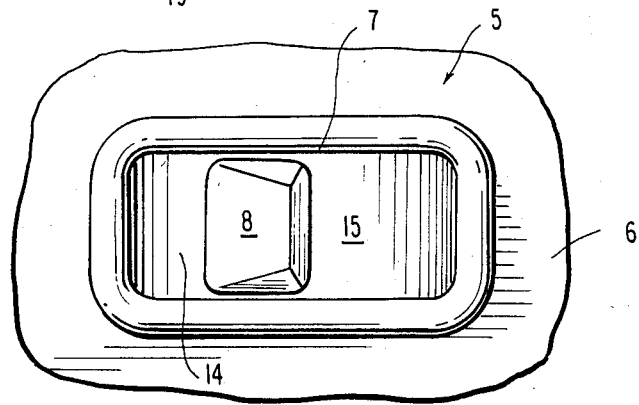
FIG. 3 is a schematic plan view on the switch in accordance with the present invention.

As can be seen in particular from FIGS. 2 and 3, the surface flange or collar portion 7 of the switch 5 facing the operating person and installed, for example, into the vehicle ceiling 6, is of such a configuration that it symbolizes the vehicle roof 1 as such. The control element 8 which symbolizes in its surface configuration approximately the shapes of the sliding-lifting-roof 2, is installed into the surface flange part 7 and more particularly in such a position that altogether the vehicle roof with installed sliding-lifting-roof is symbolized thereby. The control element 8 is arranged partially recessed in the surface flange portion so that it can be supported in lateral walls 5' of the switch 5. For that purpose, an elongated aperture 9 extending in the direction of the switch longitudinal axis 5''', on the one hand, is provided in the lateral walls 5' and a cross-shaped template 10, on the other, is provided in the lateral walls 5' at a corresponding longitudinal distance, whose one guide track 10' extends also in the direction of the switch longitudinal axis 5''' and whose other guide track 10'' extends along a circular path about a pivot axis 11. The pivot axis 11 is thereby formed by guide cams 12 arranged at both longitudinal sides of the control element 8 which in the zero position of the control element 8, effected by spring means, lie approximately in the center of the elongated aperture 9 whereas two further guide cams 13 at the control element 8 come to rest in the zero position thereof in the center of the guide track 10. Starting from the surface flange portion 7, handling recesses are formed in the switch 5 in front and to the rear of the control element 8 whereby the forward handling recess 14 has a lesser depth than the rear handling recess 15. Whereas the forward handling recess 14 passes over into a first actuating surface 8' of the control element 8, the rear handling recess 15 extends up to underneath the control element 8 so that the second operating surface 8'' thereof is accessible for the finger of the operating person, i.e., the control element 8 can be engaged from behind. A third actuating surface 8''' then additionally adjoins the second operating surface 8'', which extends approximately parallel to the first operating surface 8', whereby the third operating surface 8''' passes over into an operating surface 8''''. The operation of the switch 5 is now as follows:

For opening the sliding-(lifting-)roof 2, the control element 8 is displaced in the direction of arrow 16—i.e. in the direction of the switch longitudinal axis 5''''—by abutment of the finger of the operating person at the operating surface 8'—whereby the handling recess 14 forms a counterabutment for the finger—, as a result of which the adjusting drives of the roof for the sliding roof function are activated by switching corresponding switch contacts in the switch component 5''. This movement of the control element 8 in the direction of arrow 16 is analogous to the movement of the sliding-(lifting-)roof into its open position. During this sliding displacement of the control element 8, the guide cams 12 slide in the elongated apertures 9 as also the guide cams 13 slide in the guide tracks 10' in the direction of arrow 16, as a result of which it is assured that the control element 8 cannot also be pivoted additionally at the same time about its pivot axis 11. As soon as the actuating force in the direction of arrow 16 is halted by the operating person, the sliding roof opening movement is also stopped and the control element 8 is returned again into its zero position by the spring means.

For closing the sliding-(lifting-)roof 2, the control element 8 is now displaced in the direction of arrow 17 by abutment of the finger of the operating person at the operating surface 8''', as a result of which the adjusting drives of the roof for the closing of the sliding-(lifting-)roof are activated in an analogous manner by switching corresponding switch contacts in the switch component 5''. This movement of the control element 8 in the direction of arrow 17 is analogous to the movement of the sliding-(lifting-)roof into its closing position. The guide cams 12 again slide in the elongated apertures 9 as also the guide cams 13 slide in the guide tracks 10' in the direction of arrow 17 during this sliding displacement of the control element 8, as a result of which it is assured that the control element 8 cannot also be pivoted additionally about its pivot axis 11. As soon as the actuating force in the direction of arrow 17 is halted by the operating person, also the sliding roof closing movement is stopped and the operating element is returned into its zero position.

For opening the (sliding-)lifting-roof 2, the control element 8 is pivoted in the direction of arrow 18 by abutment of the finger of the operating person at the actuating surface 8'''', as a result of which, the adjusting drives of the roof for the opening of the (sliding-)lifting-roof are activated by switching corresponding switch contacts in the switch component part 5''. If the sliding-(lifting-)roof is thereby still in any open position, then care must be taken by the use of corresponding circuit techniques, known as such in the art, that the sliding-(lifting-)roof is initially closed and only thereafter the (sliding-)lifting-roof can be opened. Since this can be readily achieved by conventional control circuits, a detailed description thereof is dispensed with herein. The movement of the control element 8 in the direction of arrow 18 is again analogous to the movement of the (sliding-)lifting-roof into its opened position. The control element 8 which forms a one-armed lever, thereby rotates about its pivot axis 11, which is located further forwardly with respect to the actuating surface 8'''' and corresponds analogously to the lifting roof pivot axis, whereas the guide cams 13 now slide in the guide tracks 10'' in the direction of arrow 18, as a result of which it is assured that the control element cannot also be additionally moved in the direction of arrows 16 or 17. As soon as the actuating force in the direction of arrow 18 is interrupted, the lifting-roof opening movement is also stopped and the control element is again returned into its zero position by spring means.

For closing the (sliding-)lifting-roof, the control element 8 is pivoted in the direction of arrow 19 by abutment of the finger of the operating person at the actuating surface 8'' introduced by way of the handling recess 15, as a result of which the adjusting drives of the roof for the closing of the (sliding-)lifting-roof are activated by switching corresponding switch contacts in the switch component 5''. The movement of the control element 8 in the direction of arrow 19 is thereby again analogous to the movement of the (sliding-)lifting-roof into its closing position whereby the control element 8 rotates about the pivot axis 11 whereas the guide cams 13 slide in the guide tracks 10'' in the direction of arrow 19 in order thus to prevent movement of the control element 8 in the direction of arrows 16 or 17.

Thus, it is significant of the present invention that the switch 5 with its control element 8 symbolizes altogether the vehicle roof with installed sliding-lifting-roof and that the actuating directions of the control element correspond analogously to the movement directions of the sliding-lifting-roof.

If the sliding-lifting-roof involves a transparent roof, then it is possible in an advantageous manner to make the control element also of transparent material, or at least to cover the surface facing the operating person with transparent material. In principle, however, for contrast enhancement, the control element and the switch may also have different colors and for easier findability the control element may be constructed at the same time as a light field to provide illumination.

In lieu of the described switch whose control element is always returned by spring means into the zero position after the actuation, also a switch may be used whose control element remains in the displaced, respectively, pivot position so that the movement of the control element carried out last, remains preserved and thus also remains visible for the operating person.

Such a switch can additionally be so further developed and constructed in an advantageous manner that the opening travel of the sliding-lifting-roof can be preselected, for example, if the control element is displaced by half the adjusting path, the sliding-lifting-roof also travels only into its half-open position. Again, this can be achieved by known control techniques so that a detailed description thereof is dispensed with herein for the sake of simplicity.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A switch structure for an adjustable sliding-lifting-roof of a motor vehicle remotely actuated by an auxiliary force, comprising control means for activating adjusting drive means of the roof for the sliding-roof function by oppositely directed sliding movements and for activating adjusting drive means of the roof for the lifting-roof function by pivot movements, the control means including a single control element for both oppositely directed movements whose visible surface configuration facing an operating person symbolically corresponds approximately to the shapes of the sliding-lifting-roof and which is arranged in a surface flange portion of the switch structure symbolically corresponding approximately to the shapes of the entire vehicle roof as viewed in plan view in such a manner that altogether the vehicle roof with installed sliding-lifting-roof is symbolized thereby.

2. A switch structure according to claim 1, wherein the control element is pivotally supported in the switch structure about a pivot axis extending in the switch transverse direction for activating the lifting-roof function, said pivot axis being analogous to the lifting-roof pivot axis.

3. A switch structure according to claim 2, wherein the control element is displaceably supported in the switch in the direction of a switch longitudinal axis for activating the sliding-roof function, said direction being analogous to the roof sliding direction.

4. A switch structure according to claim 3, wherein the pivot axis and the switch longitudinal axis intersect one another substantially perpendicularly.

5. A switch structure according to claim 4, wherein the pivot axis is defined by pivot shaft means pivotally and displaceably supported approximately centrally in an elongated aperture of the switch structure forming a sliding displacement guidance and extending in the direction of the switch longitudinal axis, and said pivot shaft means serving at the same time as guide cam means for the sliding movement of the control element.

6. A switch structure according to claim 5, wherein the switch structure includes a cross-shaped template means and the control element includes further guide cam means located in the zero position of the control element substantially in the center of the cross-shaped template means, whose one guide track extends in the direction of the switch longitudinal axis and whose other guide track extends along a circular path about the pivot axis.

7. A switch structure according to claim 6, wherein the control element is retained in its zero position by spring means.

8. A switch structure according to claim 6, wherein handling recess means are formed in the switch structure in front and to the rear of the control element.

9. A switch structure according to claim 8, wherein the forward handling recess means has a smaller depth than the rear handling recess means.

10. A switch structure according to claim 9, wherein the rear handling recess means extends up to underneath the control element for engagement from behind thereof.

11. A switch structure according to claim 7, wherein the control element and the switch structure have different colors.

12. A switch structure according to claim 11, wherein the control element consists of transparent material.

13. A switch structure according to claim 12, wherein the control element is constructed simultaneously as light field means for illumination purposes.

14. A switch structure according to claim 7, wherein the switch structure is installed approximately centrally between the forward sliding-lifting-roof edge and the forward roof edge of the vehicle.

15. A switch structure according to claim 1, wherein the control element is displaceably supported in the switch in the direction of a switch longitudinal axis for activating the sliding-roof function, said direction being analogous to the roof sliding direction.

16. A switch structure according to claim 2, wherein the pivot axis is defined by pivot shaft means pivotally and displaceably supported approximately centrally in an elongated aperture of the switch structure forming a sliding displacement guidance and extending in the direction of the switch longitudinal axis, and said pivot shaft means serving at the same time as guide cam means for the sliding movement of the control element.

17. A switch structure according to claim 16, wherein the switch structure includes a cross-shaped template means and the control element includes further guide cam means located in the zero position of the control element substantially in the center of the cross-shaped template means, whose one guide track extends in the direction of the switch longitudinal axis and whose other guide track extends along a circular path about the pivot axis.

18. A switch structure according to claim 1, wherein the control element is retained in its zero position by spring means.

19. A switch structure according to claim 6, wherein handling recess means are formed in the switch structure in front and to the rear of the control element.

20. A switch structure according to claim 19, wherein the forward handling recess means has a smaller depth than the rear handling recess means.

21. A switch structure according to claim 19, wherein the rear handling recess means extends up to underneath the control element for engagement from behind thereof.

22. A switch structure according to claim 1, wherein the control element and the switch structure have different colors.

23. A switch structure according to claim 22, wherein the control element consists of transparent material.

24. A switch structure according to claim 23, wherein the control element is constructed simultaneously as light field means for illumination purposes.

25. A switch structure according to claim 1, wherein the switch structure is installed approximately centrally between the forward sliding-lifting-roof edge and the forward roof edge of the vehicle.

* * * * *